United States Patent
Dechanteloup et al.

[11] Patent Number: 6,048,225
[45] Date of Patent: Apr. 11, 2000

[54] CONNECTION MODULE INCORPORATING DETACHABLE CONTACTS AND CONNECTION BLOCK USING SAID MODULE

[75] Inventors: Jean-Michel Dechanteloup, Le Mans; Jean-Yves Lecoq, Mulsanne, both of France

[73] Assignee: Framatome Connectors International, Courbevoie, France

[21] Appl. No.: 08/829,549

[22] Filed: Mar. 28, 1997

[30] Foreign Application Priority Data

Mar. 29, 1996 [FR] France .................................. 96 03992

[51] Int. Cl.⁷ .................................................. H01R 13/40
[52] U.S. Cl. ........................................ 439/595; 439/752
[58] Field of Search .................................... 439/595, 752, 439/871, 744, 594, 745, 747

[56] References Cited

U.S. PATENT DOCUMENTS

| | | | |
|---|---|---|---|
| 5,139,447 | 8/1992 | Yoneda et al. | |
| 5,308,265 | 5/1994 | Kaneko | 439/752 |
| 5,397,249 | 3/1995 | Endo et al. | 439/595 |
| 5,501,620 | 3/1996 | Ishii et al. | 439/752 |
| 5,522,740 | 6/1996 | Plocek et al. | 439/752 |
| 5,730,626 | 3/1998 | Tomita et al. | 439/595 |
| 5,738,542 | 4/1998 | Jakobeit et al. | 439/595 |
| 5,816,856 | 10/1998 | Kamath et al. | 439/595 |
| 5,839,914 | 11/1998 | Watanabe et al. | 439/488 |
| 5,944,557 | 8/1999 | Fukuda | 439/595 |

*Primary Examiner*—Paula Bradley
*Assistant Examiner*—Ross Gushi
*Attorney, Agent, or Firm*—Pollock, Vande Sande & Amernick

[57] ABSTRACT

The module comprises a connection box that can be coupled to a similar box belonging to a complementary module, and a retention plate adapted to lock each of a number of electric contacts between a shoulder of a passage and a resilient pawl integral with the relation plate, which is movable between a retracted contact-insertion/-extraction position and a forward contact-retention position. Each pawl is extended by a finger having a curved end and a shape such that it is stopped against a terminal projection of the box when the plate is in its retracted position, and it then moves the pawl away from the contact-retention position thereof.

6 Claims, 2 Drawing Sheets

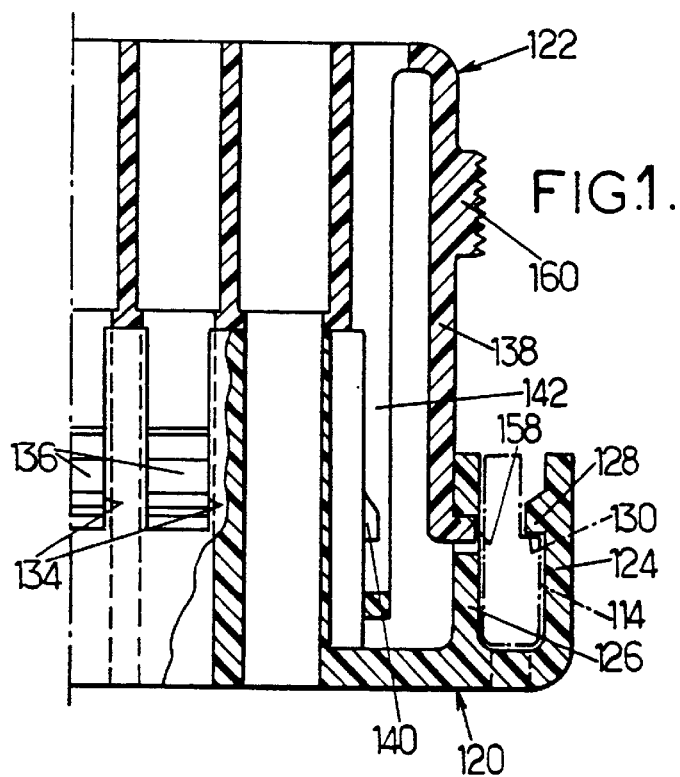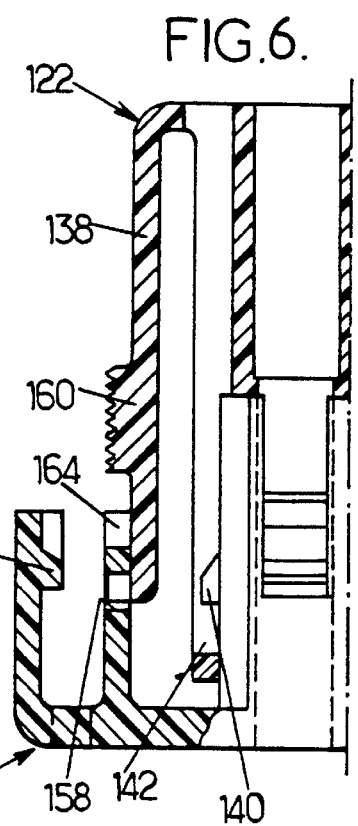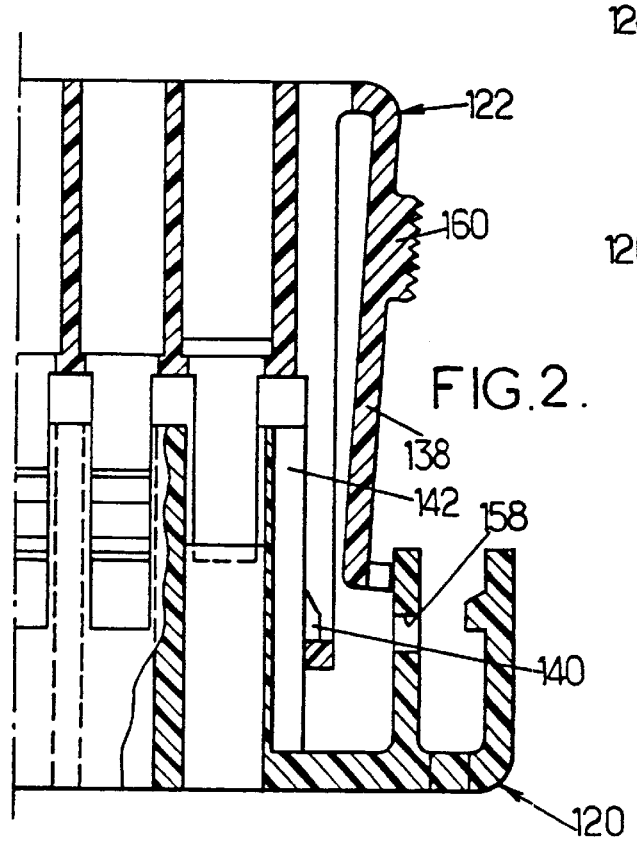

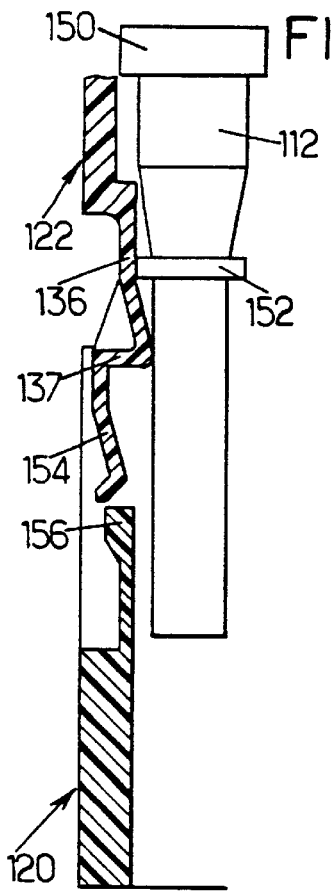
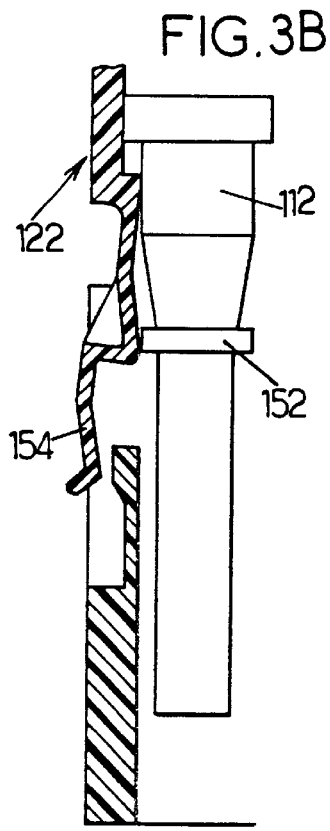
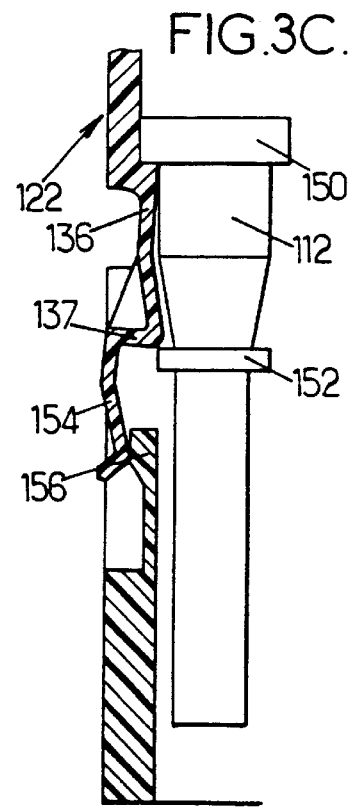
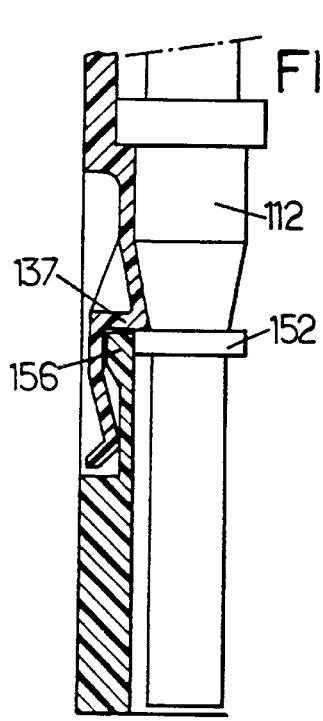
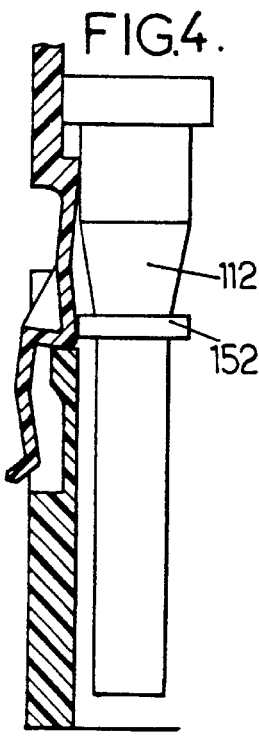
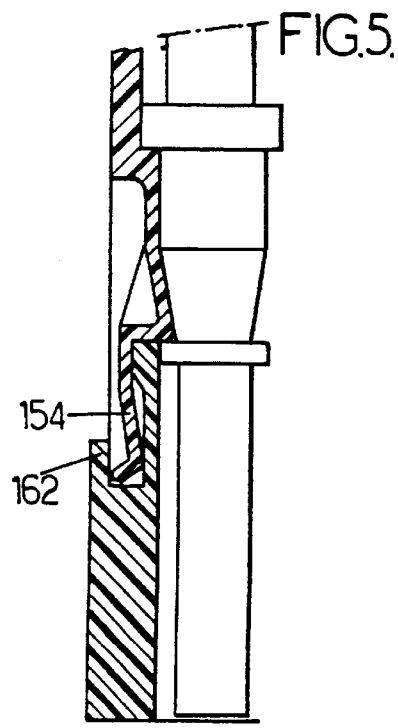

CONNECTION MODULE INCORPORATING DETACHABLE CONTACTS AND CONNECTION BLOCK USING SAID MODULE

FIELD OF THE INVENTION

The invention relates to connection modules incorporating detachable contacts, and, in particular (but not exclusively) to modules that can be inserted side by side in a module-carrier plate so as to form a connection block. Such modules are described, for example, in French Patent Application No. 95 05664, to which reference may be made.

This type of module comprises a connection housing that can be coupled with the housing of a complementary module, and a retention plate designed to lock each of the electric contacts between a shoulder of a passage and an elastic pawl integral with the plate, which is movable between a retracted contact-insertion/-extraction position and a forward contact-retention position. In the embodiments which will be described, each housing is equipped with stop means which limit its forward travel in relation to a housing plate and with locking means which resists its backward motion from an advanced position in which it is stopped, and each plate is fitted with means for attachment to the housing designed to lock it in a determinate position in relation to the housing.

In general, the module comprises a single row of contacts, although this configuration is not essential.

SUMMARY OF THE INVENTION

The invention is intended to supply a modular plug-in electric connection module which, better than those according to prior art, meets the requirements of the profession, in particular because it allows ease of positioning and removal of the contacts and/or detachment of the module without tools, while incorporating a relatively simple structure.

To this end, the invention proposes a module of the type described above and characterized by the fact that each pawl is extended by a finger having a curved end and a shape such that it is stopped against a terminal projection of the housing when the plate is in the retracted position, and that it then moves the pawl away from its contact-retention position.

In one advantageous embodiment the plate-attachment means comprise lateral elastic arms which extend beginning at the rear of the retention plate, enclose the retention plate while leaving a gap, and are fitted with terminal lugs or catches designed to hook onto the housing.

By virtue of this configuration usable independently of the preceding one, it is possible to unlock the lateral arms by squeezing them inward with the hand in order to release the retention plate and allow it to be released without using tools.

The housing can be fitted with temporary lug-retention means designed to determine a rear position of the plate in which the plate allows the insertion and removal of the contacts.

The elastic pawls can be provided either so as to allow insertion (but not removal) of the terminals when the housing is locked on the plate, or, to the contrary, to prohibit any contact-insertion or -removal operation in this situation.

BRIEF DESCRIPTION OF THE DRAWINGS

The features described above and others that can profitably be used in conjunction with the preceding ones, but which are usable independently, will more clearly emerge from a reading of the following description of specific embodiments of the invention provided as non-limiting examples. The description makes reference to the accompanying drawings, in which:

FIG. 1 is a raised view in partial cross-section of a portion of a module according to a first assembled embodiment of the invention, the contacts not being shown;

FIG. 2, similar to FIG. 1, illustrates the module with the plate partially pushed in;

FIGS. 3A and 3D illustrate the successive steps involved in the insertion of a contact and the assembly of the module;

FIG. 4, similar to FIG. 3D, illustrates the possibility of insertion of a contact while the plate is locked on the housing;

FIG. 5, similar to FIG. 2, illustrates a variant preventing the insertion of contacts when the plate is locked on the housing; and FIG. 6, similar to FIG. 2, illustrates a variant.

DESCRIPTION OF THE PREFERRED EMBODIMENTS

In all of the embodiments illustrated, the module is constituted by a housing 120 and a plate 122 designed to hold the contacts 112 in place (FIGS. 3A to 3D, 4, and 5).

The housing 120 is provided to be locked on the longitudinal members of a plate 114 in a position adjacent to another module (FIG. 1).

In the embodiment illustrated in FIGS. 1 and 2, the elastic means locking the housing on the longitudinal members comprise, on each housing, two outer retaining arms 124 forming one piece with the rest of the housing and designed to enclose the longitudinal members of the plate 114. Each of these outer retaining arms 124 ends in a catch 128 designed to click in place on an outer shoulder 130 of a respective longitudinal member. These means also comprise inner arms 126 set at a distance from the main part of the housing, which is designed to house the contacts 112.

The housing 120 incorporates parallel passages 134 for housing electric contacts 112, which are female contacts in the case illustrated in FIGS. 3A–3D, 4, and 5.

The plate 122 is configured to house the electric contacts and to hold them forcefully in place.

To this end, the plate 122 has a bottom drilled with passages for the contacts and constituting a shoulder supporting a first collar 150 of the corresponding contact. The bottom is extended by elastic contact-retention pawls 136. Each pawl 136 incorporates extending from its base, an elastic portion, then a bent portion 137 designed to be supported on a second collar 152 of a contact (FIGS. 3C and 3D). The distance between the shoulder and the bent portion 137 is very slightly greater than the distance between the opposing faces of the collars 150 and 152. The bent portion has a height sufficient to allow it to be supported on the housing 120 when the plate is locked on the housing.

Each pawl 136 is extended by a finger 154 having a curved end. When the finger is in the unengaged position (FIG. 3A), it has a shape such that it is stopped against a terminal projection 156 of the housing, if the plate is pushed in. However, the end curvature is such that the projection bends the pawl outward under the effect of the force of penetration and allows the pawl to adopt the position shown in FIG. 3D.

The plate-locking means comprise later elastic arms 138 forming one piece with the retention plate and extending from the rear of the plate, and they enclose the retention plate and extend downward beyond the pawls. These lateral arms are equipped with terminal lugs designed to engage in holes 158 in the inner arms of the housing. The arms may have a bulged, grooved portion 160 making it easier to grasp them. A gap sufficient to allow release of the lugs by bending the arms is provided between the body of the housing and each arm. By manually pressing the arms together, the plate can first be pushed in up to an intermediate position illustrated in FIG. 2, then up to a locking position in which the lugs are engaged elastically in the holes 158.

In the embodiment illustrated in FIGS. 1 to 4, the contacts can be put in place no matter what the position of the plate in relation to the housing, even when the plate is locked on the housing. On the other hand, the contacts can be withdrawn from the plate without manipulating the pawls manually only when the plate is in the position illustrated in FIG. 3C. To avoid inadvertently pulling the slide beyond this prelocking position, the plate and the housing carry temporary retention means. In the case illustrated in FIGS. 1 and 2, these means are constituted by catches 140 forming outer projections of the housing and each of them engages in an elongated slot 142 in a partition which extends one of the sides of the plate laterally. The position of the plate can be freely adjusted between the positions shown in FIGS. 1 and 2.

FIGS. 3A and 3B show that the contacts 112 can be inserted when the plate is in the retracted position. FIG. 4 shows that the contacts can also be inserted by pushing the pawls 136 back, while the plate 122 is locked on the housing 120. On the other hand, the contacts can be withdrawn only when the plate is in the position illustrated in FIG. 3C, in which the pawls are pushed backward by the projections 156. They can no longer be pushed backward when the plate is locked on the plate (FIG. 3D).

On the contrary, in the variant shown in FIG. 5 the housing 120 comprises lateral stops 162 delimiting cavities in which the ends of the fingers 154 are inserted when the plate is locked on the housing. These stops prevent the fingers and pawls from bending, and, therefore, they prohibit insertion of the contacts.

FIG. 6 illustrates a variant of the housing 120 in which an intermediate position of the plate, in which insertion and removal are permitted, is determined by notches 164 in the inner arms 126. If the plate is pushed in without bringing the arms 138 together, the plate moves forward to the position shown in FIG. 2, in which it is held in place toward the front by virtue of the support of the lugs, and to the rear by the catches 140. To push the plate in completely, it is first necessary to release the catches by bringing together the lateral elastic arms 138, then by pushing the plate until the lugs are positioned opposite the holes 158.

What is claimed is:

1. A connection module incorporating detachable contacts, comprising a connection housing that can be coupled with a complementary module, and a retention plate adapted to lock each of a plurality of electric contacts between a shoulder of a passage and a single locking piece integral with the retention plate, said retention plate being movable between a retracted contact-insertion/extraction position and a forward contact-retention position, wherein said single locking piece is constituted by a pawl which comprises, in succession, a resilient portion, a substantially horizontal bent portion adapted to be supported on a collar of a contact, and an extended portion constituted by a finger which has a curved end and a shape such that it is stopped against a terminal projection of the housing when the retention plate is in the retracted position, and which moves the pawl away from said contact-retention position.

2. The connection module according to claim 1, wherein the plate is equipped with means for attachment to the housing, said means being adapted to lock said plate in a fixed position in relation to the housing.

3. The connection module according to claim 2, wherein the plate-attachment means comprise lateral elastic arms fitted with terminal lugs adapted to be fastened to the housing.

4. The connection module according to claim 3, wherein the housing is fitted with temporary lug-retention means adapted to determine the retracted position of the plate.

5. The connection module according to claim 3, wherein the lateral elastic arms extend from the rear of the plate and enclose the retention plate, while allowing a gap to remain.

6. The connection module according to any one of claims 1 to 4, comprising external catches on the housing adapted to engage in recesses in a slot which laterally extends a side of said plate so as to resist retraction of the plate, and wherein said module is fitted with stop means which limit the forward travel thereof in relation to a housing plate and with locking means resisting its rearward motion.

* * * * *